United States Patent
Yang

(10) Patent No.: US 8,959,404 B2
(45) Date of Patent: *Feb. 17, 2015

(54) METHOD FOR CONTROLLING ACCESS OPERATIONS OF A FLASH MEMORY, AND ASSOCIATED FLASH MEMORY DEVICE AND FLASH MEMORY CONTROLLER

(71) Applicant: Silicon Motion Inc., Hsinchu County (TW)

(72) Inventor: Tsung-Chieh Yang, Hsinchu (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 103 days.

This patent is subject to a terminal disclaimer.

(21) Appl. No.: 13/741,396

(22) Filed: Jan. 15, 2013

(65) Prior Publication Data

US 2013/0132654 A1 May 23, 2013

Related U.S. Application Data

(63) Continuation of application No. 12/692,618, filed on Jan. 24, 2010, now Pat. No. 8,386,856.

(60) Provisional application No. 61/222,465, filed on Jul. 1, 2009.

(30) Foreign Application Priority Data

Aug. 10, 2009 (TW) .............................. 98126689 A

(51) Int. Cl.
*G06F 11/00* (2006.01)
*G11C 29/00* (2006.01)
*H03M 13/00* (2006.01)

(Continued)

(52) U.S. Cl.
CPC ........ *G06F 12/0246* (2013.01); *G06F 11/1072* (2013.01)
USPC ............................ 714/701; 714/719; 714/761

(58) Field of Classification Search
CPC .... G06F 12/0246; G06F 11/1072; G11C 7/22
USPC .......................... 714/701, 702, 719, 746, 761
See application file for complete search history.

(56) References Cited

U.S. PATENT DOCUMENTS 7,411,898 B2 * 8/2008 Erlich et al. ................... 370/208
8,077,784 B2 * 12/2011 Nishikawa .................... 375/260

(Continued)

OTHER PUBLICATIONS

Jahinuzzaman, S.; Shakir, T.; Lubana, S.; Shah, J.S.; Sachdev, M.;, "A multiword based high speed ECC scheme for low-voltage embedded SRAMs," Solid-State Circuits Conference, 2008. ESSCIRC 2008. 34th European, vol., No., pp. 226-229, Sep. 15-19, 2008.*

(Continued)

*Primary Examiner* — Cynthia Britt
(74) *Attorney, Agent, or Firm* — Winston Hsu; Scott Margo

(57) ABSTRACT

A method for controlling access operations of a flash memory includes: receiving first source data from a host; generating a plurality of first scrambled signals according to a plurality of pseudo random sequences and the first source data; obtaining a plurality of transmission powers of the first scrambled signals; and selecting a target scrambled signal from the first scrambled signals according to the transmission powers for storing to the flash memory. An associated flash memory device and an associated flash memory controller are also provided.

12 Claims, 7 Drawing Sheets

(51) Int. Cl.
  *G06F 12/02* (2006.01)
  *G06F 11/10* (2006.01)

(56) References Cited

U.S. PATENT DOCUMENTS

| | | | |
|---|---|---|---|
| 8,189,711 B2* | 5/2012 | Shimizu | 375/295 |
| 8,386,856 B2* | 2/2013 | Yang | 714/701 |
| 2005/0229081 A1* | 10/2005 | Lin et al. | 714/769 |
| 2011/0202780 A1* | 8/2011 | Ko | 713/320 |

OTHER PUBLICATIONS

Ik Joon Chang; Jae-Joon Kim; Park, S.P.; Roy, K.;, "A 32 kb 10T Sub-Threshold SRAM Array With Bit-Interleaving and Differential Read Scheme in 90 nm CMOS," Solid-State Circuits, IEEE Journal of, vol. 44, No. 2, pp. 650-658, Feb. 2009.*

Nimbalker, A.; Blankenship, T.K.; Classon, B.; Fuja, T.E.; Costello, D.J.;, "Contention-Free Interleavers for High-Throughput Turbo Decoding," Communications, I EEE Transactions on, vol. 56, No. 8, pp. 1258-1267, Aug. 2008.*

* cited by examiner

METHOD FOR CONTROLLING ACCESS OPERATIONS OF A FLASH MEMORY, AND ASSOCIATED FLASH MEMORY DEVICE AND FLASH MEMORY CONTROLLER

CROSS REFERENCE TO RELATED APPLICATIONS

This application is a continuation application of U.S. patent application Ser. No. 12/692,618 filed on Jan. 24, 2010, the entirety of which is incorporated by reference herein. The U.S. patent application Ser. No. 12/692,618 claims the benefit of U.S. Provisional Application No. 61/222,465, filed on Jul. 1, 2009.

The U.S. patent application Ser. No. 12/692,618 claims priority of Taiwan Patent Application No. 98126689, filed on Aug. 10, 2009.

BACKGROUND OF THE INVENTION

1. Field of the Invention

The invention relates to memories, and more particularly to data access of memories.

2. Description of the Prior Art

Before data is written to a memory, a controller of the memory usually scrambles the data with a scrambler, thus making bits 0 and 1 to have a random distribution in the data. The scrambled data is then stored in the memory, thus preventing bits 0 and 1 from massing in a specific segment of the data. For example, a flash memory is classified into a single-level-cell (SLC) flash memory or a multi-level-cell (MLC) flash memory. When data is written to a MLC flash memory, if the data comprises segments comprising massed bits 0 or massed bits 1, an error bit rate of the data is increased. A controller of the MLC flash memory therefore has to scramble the data before the data is written to the MLC flash memory.

The data scrambled by a scrambler, however, has deficiency. A controller usually transmits data to a flash memory via a data bus. When the controller sends a data bit 1 to the flash memory, a voltage level of the data bus is increased to a logic high level. When the controller sends a data bit 0 to the flash memory, the voltage level of the data bus is decreased to a logic low level. Because bits 0 and 1 in scrambled data have randomized distributions, when the controller sends the scrambled data to the memory for storage via the data bus, the voltage level on the data bus frequently oscillates between the logic high level and the logic low level. The data bus therefore requires high power due to the frequent oscillation of voltage levels thereon, thus increasing power consumption of a system. When the system comprising the controller and the memory is a portable device with a battery power supply, the time span in which the system operates under a normal voltage supply is shorten, thus degrading the performance of the system. Thus, a controller which can scramble data with low power consumption is desired.

SUMMARY OF THE INVENTION

According to at least one preferred embodiment of the present invention, a flash memory device is disclosed. The flash memory device comprises: a flash memory; and a controller, coupled to the flash memory, receiving first source data from a host, generating a plurality of first scrambled signals according to a plurality of pseudo random sequences and the first source data, obtaining a plurality of transmission powers of the first scrambled signals, and selecting a target scrambled signal from the first scrambled signals according to the transmission powers for storing to the flash memory.

According to at least one preferred embodiment of the present invention, a flash memory controller for controlling access operations of a flash memory is disclosed. The flash memory controller receives first source data from a host and comprises: a plurality of scramblers, for generating a plurality of first scrambled signals according to a plurality of pseudo random sequences and the first source data; a transmission power calculation module, for obtaining a plurality of transmission powers of the first scrambled signals; and a selector, for selecting a target scrambled signal from the first scrambled signals according to the transmission powers for storing to the flash memory.

According to at least one preferred embodiment of the present invention, a method for controlling access operations of a flash memory is disclosed. The method comprises: receiving first source data from a host; generating a plurality of first scrambled signals according to a plurality of pseudo random sequences and the first source data; obtaining a plurality of transmission powers of the first scrambled signals; and selecting a target scrambled signal from the first scrambled signals according to the transmission powers for storing to the flash memory.

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
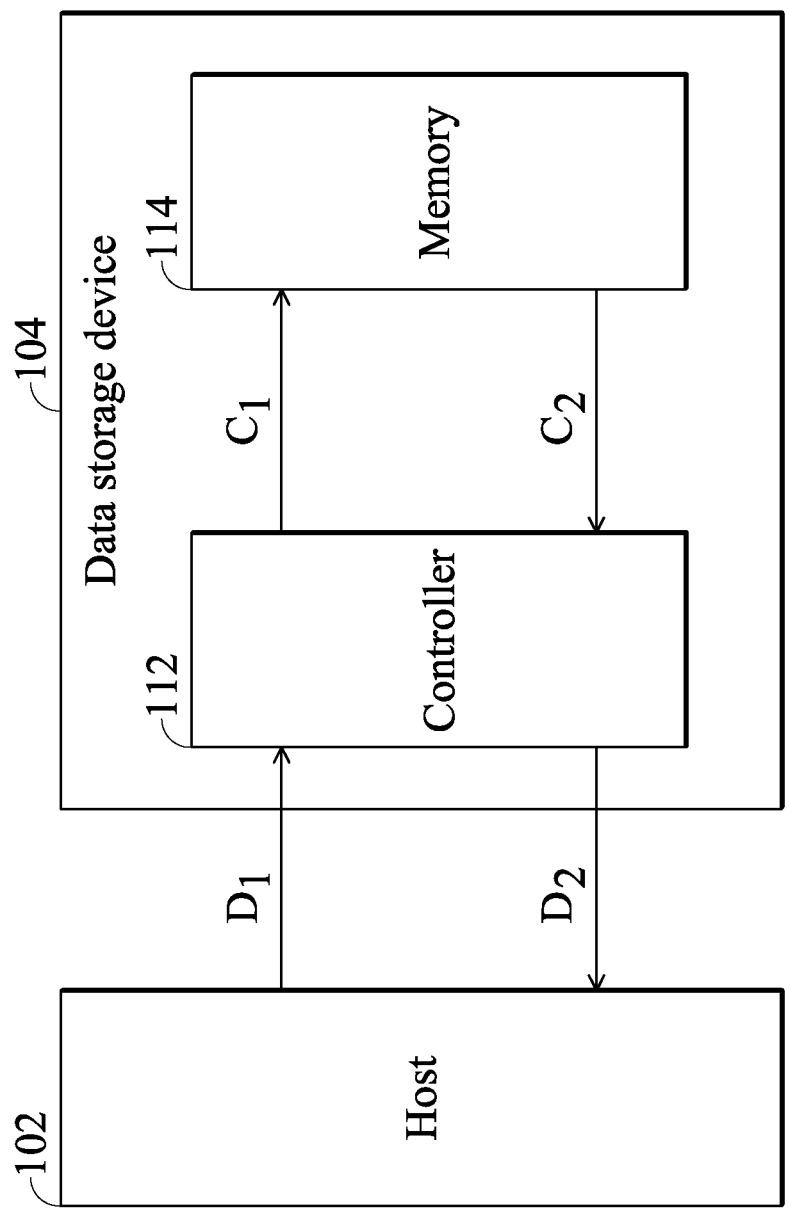
FIG. 1 shows a data storage device according to the invention.

Referring to FIG. 1, a data storage device 104 according to the invention is shown. The data storage device 100 is coupled to a host 102 and accesses data according to instructions from the host 102. In one embodiment, the data storage device 104 comprises a controller 112 and a memory 114. The memory 114 is for data storage. The controller 112 accesses data stored in the memory 114 according to instructions sent by the host 102. In one embodiment, a data bus is coupled between the controller 112 and the memory 114 for data transmission. For example, when the host 102 wants to store data $D_1$ to the data storage device 104, the controller 112 first receives data $D_1$ from the host 102, then encodes the data $D_1$ to obtain an error correction code $C_1$, and then sends the error correction code $C_1$ to the memory 114 for storage. When the host 102 wants to read data from the data storage device 104, the controller 112 directs the memory 114 to read an error correction code $C_2$ stored therein, then decodes the error correction code $C_2$ to obtain data $D_2$, and then sends the data $D_2$ to the host 102.

Before the controller 112 stores the data $D_1$ to the memory 114, the controller 112 scrambles the bits 0 and 1 of the data $D_1$, thus making the bits 0 and 1 of the scrambled data have randomized distributions, and making the scrambled data have a characteristic that is consuming lower power during being transmitted. The scrambled data is then encoded to obtain the error correction code $C_1$. Thus, when the data bus transmits the error correction code $C_1$ from the controller 112 to the memory 114, the transmission power required by the data bus is reduced. Similarly, because the error correction code $C_2$ is stored in a format with a low transmission power in the memory 114, when the data bus transmits the error correction code $C_2$ from the memory 114 to the controller 112, the data bus requires less power to transmit the error correction code $C_2$. The data storage device 104 therefore consumes a less power than that of a conventional data storage device. The data storage device 104 therefore has improved performance in comparison with a conventional data storage device.

Figure 2:
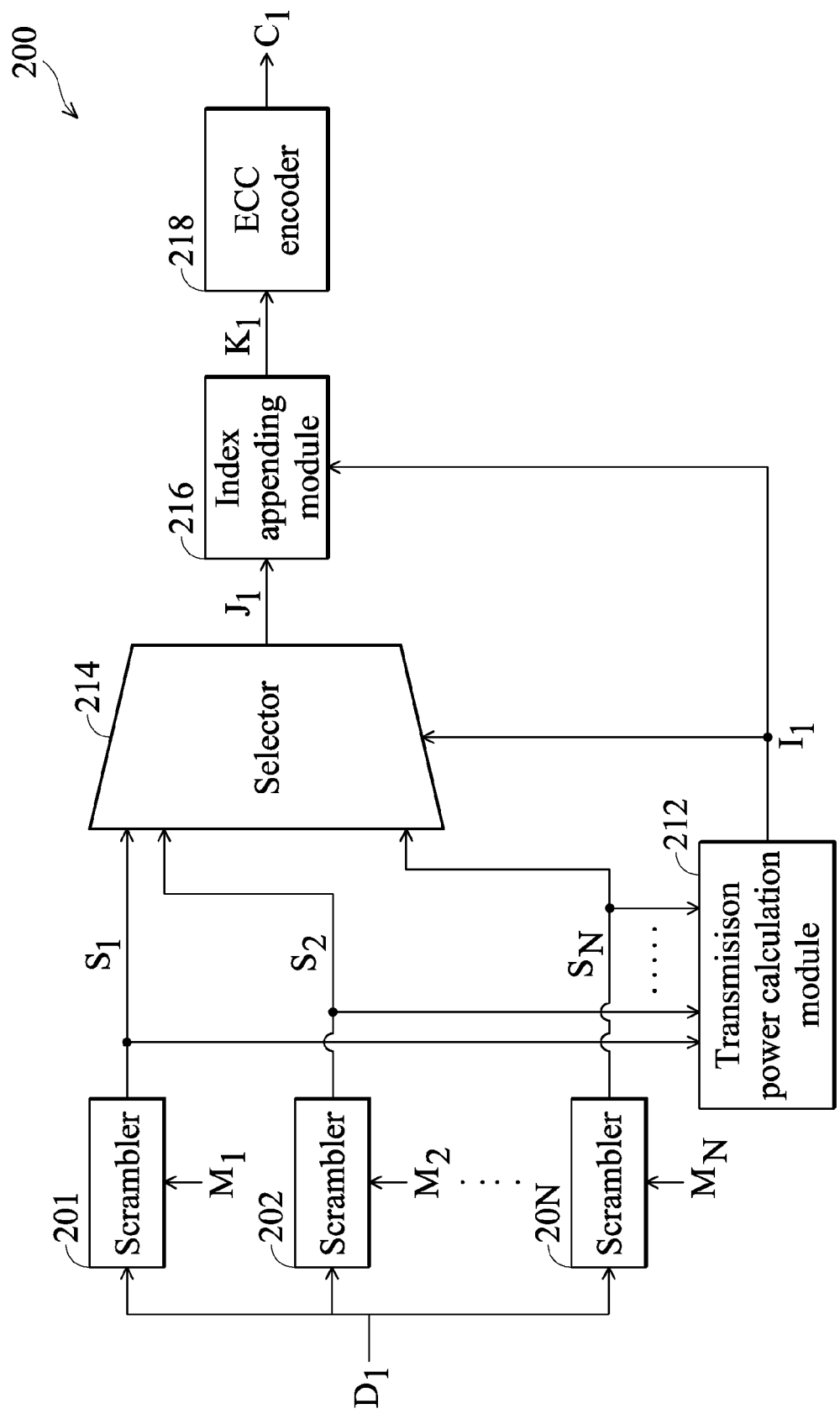
FIG. 2 is a block diagram of a write-data processing circuit of a controller according to the invention.
Figure 3:
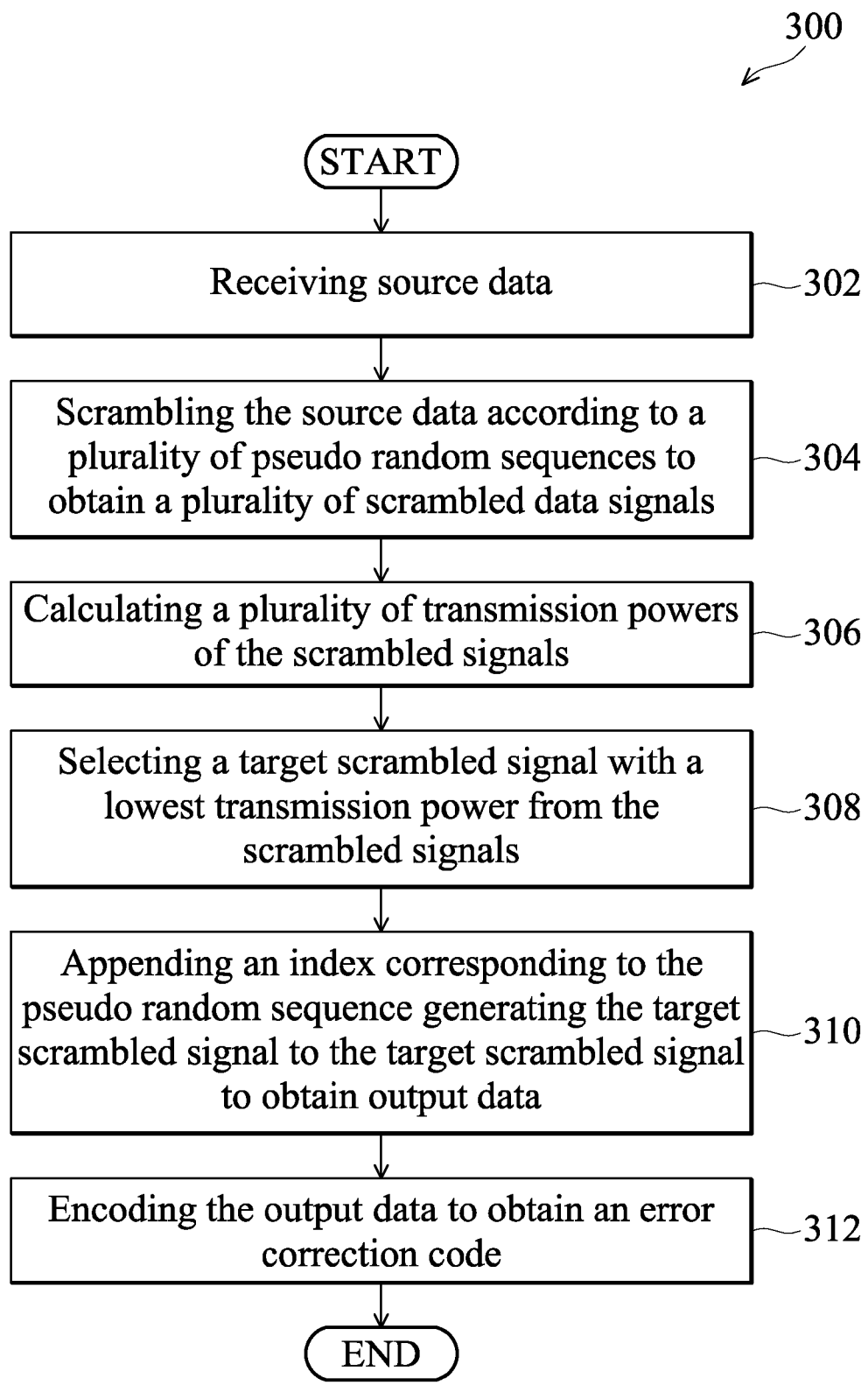
FIG. 3 is a flowchart of a method for processing data to be written to a memory according to the invention.

Referring to FIG. 2, a block diagram of a write-data processing circuit of a controller 200 according to the invention is shown. The other circuit components irrelevant to processing of write data are omitted in FIG. 2. In one embodiment, the controller 200 comprises a plurality of scramblers 201~20N, a transmission power calculation module 212, a selector 214, an index appending module 216, and an error correction code (ECC) encoder 218. Referring to FIG. 3, a flowchart of a method 300 for processing data to be written to a memory 114 according to the invention is shown. The controller 200 processes data received from the host 102 according to the method 300 shown in FIG. 3. First, the controller 200 receives source data $D_1$ to be written to the memory 114 from the host 102 (step 302). The scramblers 201, 202, . . . , 20N then respectively scramble the data $D_1$ according to a plurality of pseudo random sequences $M_1$, $M_2$, . . . , $M_N$ to obtain a plurality of scrambled signals $S_1$, $S_2$, . . . , $S_N$ (step 304). In one embodiment, the scramblers 201~20N respectively performs XOR operations on the data $D_1$ and the plurality of pseudo random sequences $M_1$, $M_2$, . . . , $M_N$ to obtain the scrambled signals $S_1$, $S_2$, . . . , $S_N$. Because the bits 0 and 1 in the scrambled signals $S_1$, $S_2$, . . . , $S_N$ have random distributions, the scrambled signals $S_1$, $S_2$, . . . , $S_N$ have low error bit rates when the scrambled signals $S_1$, $S_2$, . . . , $S_N$ are stored in the memory 114.

The transmission power calculation module 212 then calculates a plurality of transmission powers of the scrambled signals $S_1$, $S_2$, . . . , $S_N$ to be transmitted on the data bus (step 306). The transmission power calculation module 212 then selects a target scrambled signal with the lowest transmission power from the scrambled signals $S_1$, $S_2$, . . . , $S_N$ (step 308), and then outputs an index $I_1$ of a target pseudo random sequence corresponding to (for generating) the target scrambled signal. In one embodiment, the number of the pseudo random sequences $M_1$, $M_2$, . . . , $M_N$ is N, and the bit number of the index $I_1$ of the target pseudo random sequence is less than $Log_2 N$. The selector 214 then selects the target scrambled signal $J_1$ with the lowest transmission power from the scrambled signals $S_1$, $S_2$, . . . , $S_N$ according to the index $I_1$. The index appending module 216 then appends the index $I_1$ to the end of the target scrambled signal $J_1$ to obtain an output data $K_1$ (step 310). The error correction code encoder 218 then encodes the output data $K_1$ to obtain an error correction code $C_1$ to be stored in the memory 114 (step 312). Because the error correction code $C_1$ has the same bit content with that of the target scrambled signal except for a parity and the index $I_1$, the data bus transmits the error correction code $C_1$ to the memory 114 with a low transmission power.

Figure 4:
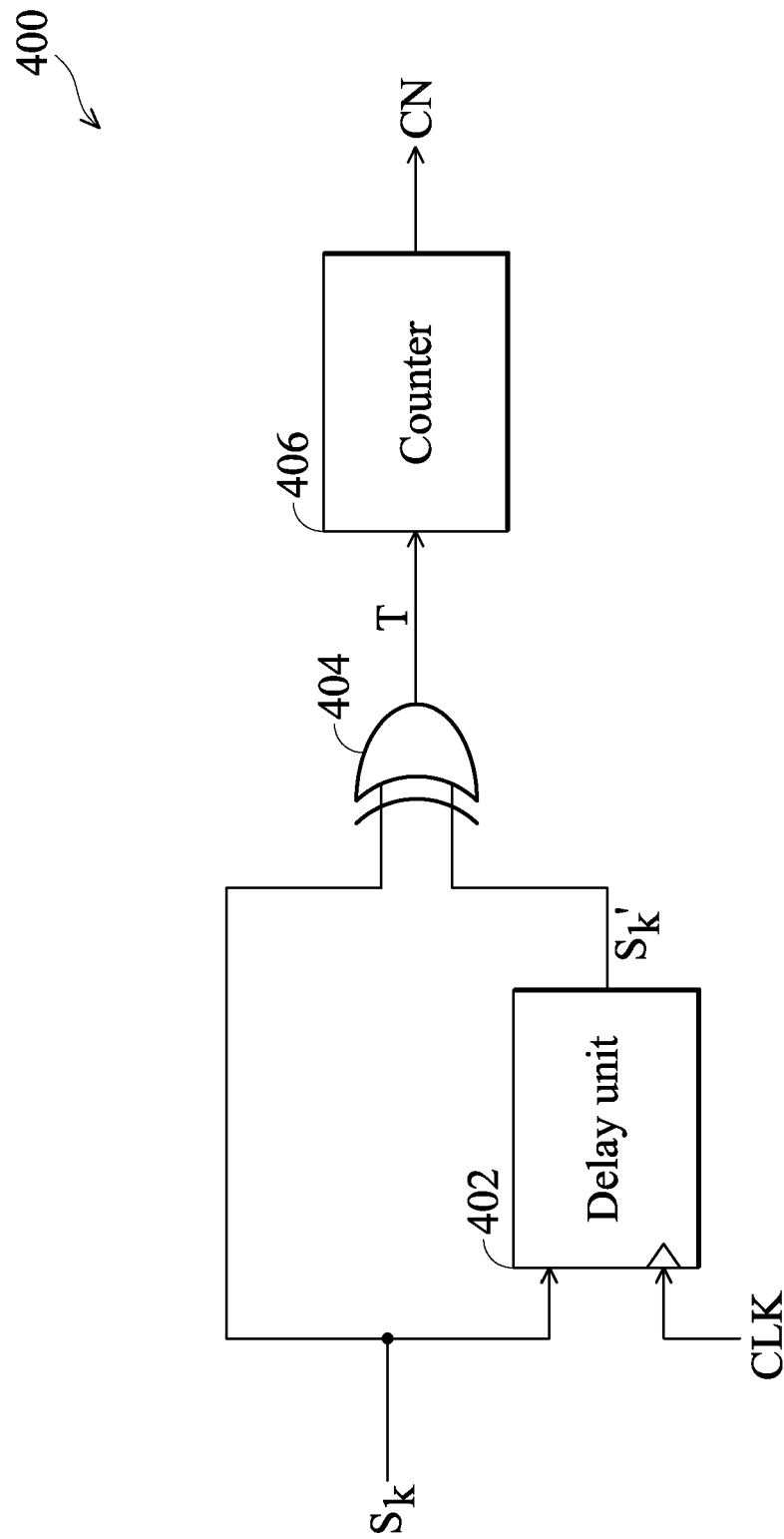
FIG. 4 is a circuit diagram of a transmission power calculation module according to the invention.

Referring to FIG. 4, a circuit diagram of a transmission power calculation module 400 according to the invention is shown. The transmission power calculation module 400 comprises a delay unit 402, an XOR gate 404, and a counter 406. Assume that the transmission power calculation module 400 receives a scrambled signal $S_k$ from a scrambler, wherein the index k may be selected from the numbers 1~N. The delay unit 402 delays the scrambled signal $S_k$ by a clock period to obtain a delayed signal $S_k'$. The XOR gate 404 then performs an XOR operation on the delayed signal $S_k'$ and the scrambled signal $S_k$ to obtain a transition signal T. When the bit of the scrambled signal $S_k$ changes from the value 0 to the value 1 or from the value 1 to the value 0, the transition signal has a corresponding value of 1. The counter 406 then accumulates the transition signal to count the number CN of times of value changes of the scrambled signal $S_k$. Thus, when the number CN of times of value changes of the scrambled signal $S_k$ is high, the data bus requires a high power to transmit the scrambled signal $S_k$.

Figure 5:
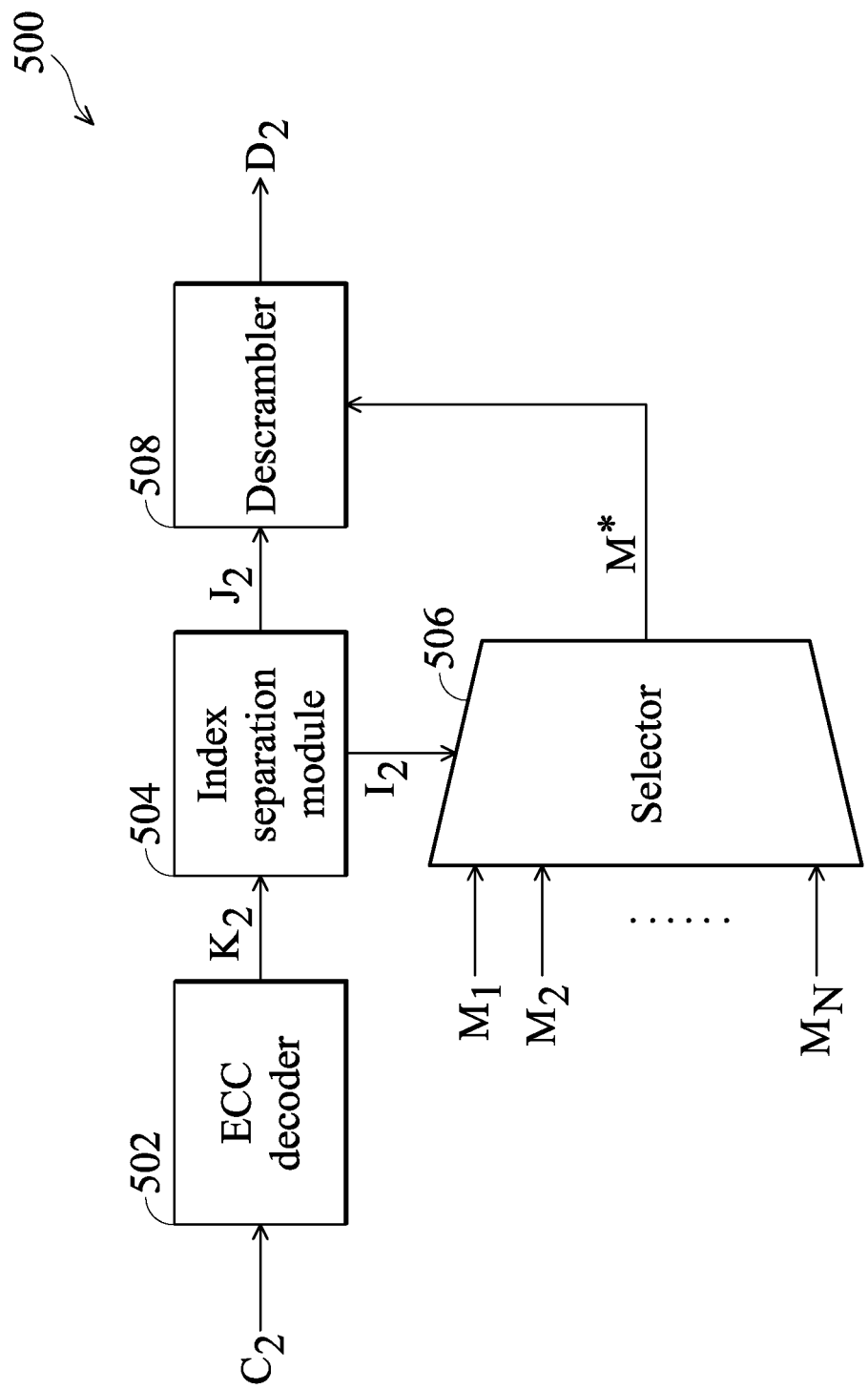
FIG. 5 is a block diagram of a read-data processing circuit of a controller according to the invention.
Figure 6:
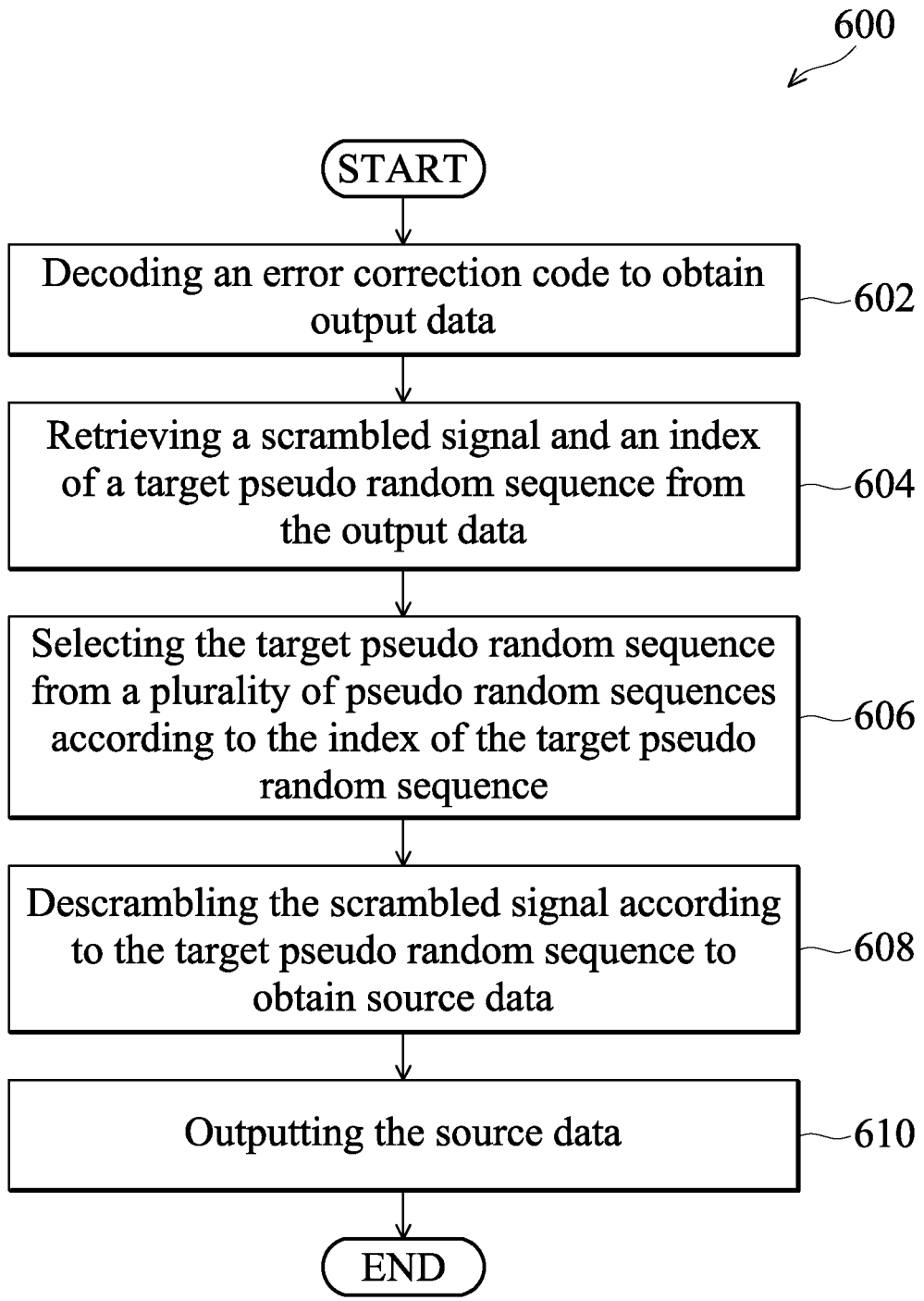
FIG. 6 is a flowchart of a method for processing data read out from a memory according to the invention.

Referring to FIG. 5, a block diagram of a read-data processing circuit of a controller 500 according to the invention is shown. In one embodiment, the controller 500 comprises an error correction code (ECC) decoder 502, an index separation module 504, a selector 506, and a descrambler 508. Referring to FIG. 6, a flowchart of a method 600 for processing data read out from the memory 114 according to the invention is shown. The controller 500 processes data read out from the memory 114 according to the method 600 and then delivers the processed data to the host 102. First, when the controller 500 receives a read command from the host 102, the controller 500 directs the memory 114 to read an error correction code $C_2$. After the controller 500 receives the error correction code $C_2$ from the memory 114, the ECC decoder 502 then decodes the error correction code $C_2$ to obtain output data $K_2$ (step 602).

Because the output data $K_2$ comprises a scrambled signal and an index of a target pseudo random sequence, the index separation module 504 retrieves the scrambled signal $J_2$ and the index $I_2$ of the target pseudo random sequence from the output data $K_2$ (step 604). The selector 506 then selects the target pseudo random sequence M* from a plurality of pseudo random sequences $M_1$, $M_2$, . . . , $M_N$ according to the index $I_2$ (step 606). The descrambler 508 then descrambles the scrambled signal $J_2$ according to the target pseudo random sequence M* to obtain source data $D_2$ (step 608). In one embodiment, the descrambler 508 performs an XOR operation on the bits of the scrambled signal $J_2$ and the target pseudo random sequence M* to obtain the source data $D_2$. Finally, the controller 500 sends the source data $D_2$ to the host 102 to complete the read operation.

Figure 7:
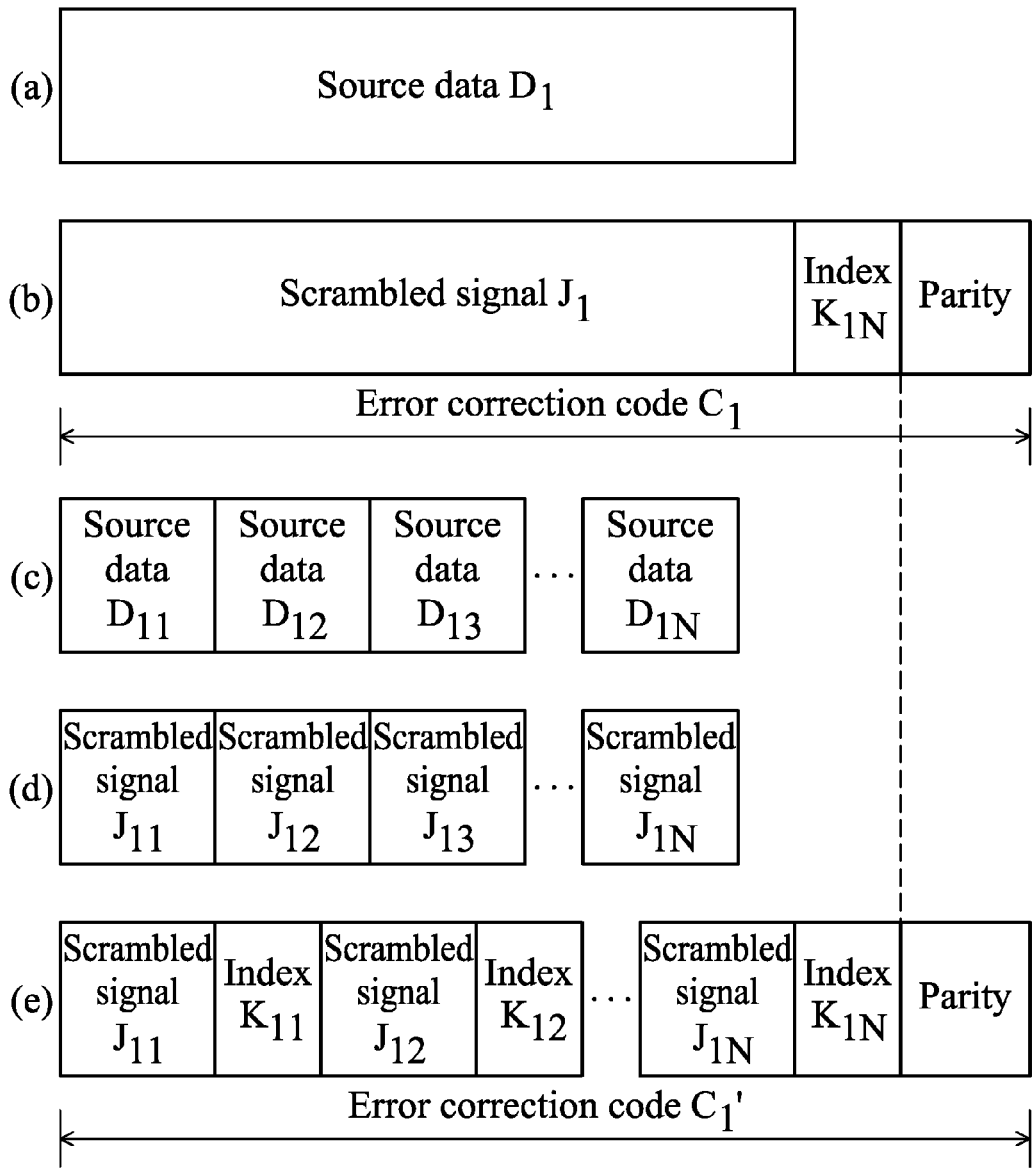
FIG. 7 is a schematic diagram of an embodiment of a data access method according to the invention.

Referring to FIG. 7, a schematic diagram of an embodiment of a data access method according to the invention is shown. Assume that the controller 112 receives source data $D_1$ to be written to the memory 114 from the host 102, as shown in (a) of FIG. 7. The controller 112 then converts the source data $D_1$ to scrambled signal $J_1$ shown in (b) of FIG. 7, wherein the scrambled signal $J_1$ has the lowest transmission power. The controller 112 then appends an index $K_{1N}$ of a pseudo random sequence and a parity to the end of the scrambled signal $J_1$ to obtain an error correction code $C_1$, as shown in (b) of FIG. 7. The plurality of pseudo random sequences $M_1, M_2, \ldots, M_N$ shown in FIG. 2 have the same data length as the source data $D_1$, and the controller 112 must comprise buffers to store the pseudo random sequences $M_1$, $M_2, \ldots, M_N$. To shorten the buffer length of the controller 112, the data lengths of the source data $D_1$ and the pseudo random sequences $M_1, M_2, \ldots, M_N$ are reduced, thus reducing hardware costs of the controller 112.

In another embodiment, the controller 112 divides the source data $D_1$ (e.g. data length of the source data $D_1$ is a page) into a plurality of segments $D_{11}, D_{12}, \ldots, D_{1N}$, as shown in (c) of FIG. 7. Each segment $D_{11}, D_{12}, \ldots, D_{1N}$ has a data length equal to 1/N of that of the source data $D_1$. The controller 112 then sequentially scrambles the segments $D_{11}$, $D_{12}, \ldots, D_{1N}$ to obtain scrambled signals $J_{11}, J_{12}, \ldots, J_{1N}$, as shown in (d) of FIG. 7. The controller 112 then combines the indexes $K_{11}, K_{12}, \ldots, K_{1N}$ of the pseudo random sequences with the scrambled signals $J_{11}, J_{12}, \ldots,$ and $J_{1N}$, to obtain the error correction code $C_1'$, as shown in (e) of FIG. 7. Because each of the segments $D_{11}, D_{12}, \ldots, D_{1N}$ has a data length equal to 1/N of the source data $D_1$, the data lengths of the buffers of the controller 112 are also equal to 1/N of the source data $D_1$ to hold the pseudo random sequences $M_1, M_2, \ldots,$ $M_N$, thus reducing hardware costs of the controller 112.

In another embodiment, encoding of an error correction code and scrambling of data are simultaneously performed. After the index appending module 216 appends the index $K_{11}$ to the end of the scrambled signal $J_{11}$, the error correction code encoder 218 simultaneously encodes the scrambled signal $J_{11}$ and the index $K_{11}$ to obtain an error correction code $C_{11}$ comprising a parity $P_{11}$. When the error correction code encoder 218 generates the error correction code $C_{11}$, the scrambler 201~20N scrambles the segment $D_{12}$, and the transmission power calculation module 212 and the selector 214 selects a scrambled signal $J_{12}$ with the lowest transmission power. Similarly, when the error correction code encoder 218 generates the error correction code $C_{12}$, the scrambler 201~20N scramble the segment $D_{13}$, and the transmission power calculation module 212 and the selector 214 selects a scrambled signal $J_{13}$ with the lowest transmission power. Thus, encoding of an error correction code and scrambling of data are simultaneously performed to improve performance of the controller 200.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory device, comprising:
a flash memory;
a controller, coupled to the flash memory, receiving first source data from a host, generating a plurality of first scrambled signals according to a plurality of pseudo random sequences and the first source data, obtaining a plurality of transmission powers of the first scrambled signals, and selecting a target scrambled signal from the first scrambled signals according to the transmission powers for storing to the flash memory.

2. The flash memory device of claim 1, wherein the controller generates the plurality of first scrambled signals by scrambling the pseudo random sequences with the first source data.

3. The flash memory device of claim 1, wherein the controller divides the first source data to generate a plurality of first input signals and scrambles the first input signals with the pseudo random sequences to obtain the first scrambled signals.

4. The flash memory device of claim 1, wherein the controller delays the first scrambled signals to obtain a plurality of delayed signals, performs XOR operations on the delayed signals and corresponding scrambled signals to obtain a plurality of transition signals, and counts the numbers of times signal value transition occurs in the transition signals to obtain the transmission powers.

5. A flash memory controller for controlling access operations of a flash memory, the flash memory controller receives first source data from a host and comprises:
a plurality of scramblers, for generating a plurality of first scrambled signals according to a plurality of pseudo random sequences and the first source data;
a transmission power calculation module, for obtaining a plurality of transmission powers of the first scrambled signals; and
a selector, for selecting a target scrambled signal from the first scrambled signals according to the transmission powers for storing to the flash memory.

6. The flash memory controller of claim 5, wherein the scramblers generate the plurality of first scrambled signals by scrambling the pseudo random sequences with the first source data.

7. The flash memory controller of claim 5, wherein the controller divides the first source data to generate a plurality of first input signals, and the scramblers scramble the first input signals with the pseudo random sequences to obtain the first scrambled signals.

8. The flash memory controller of claim 5, wherein the transmission power calculation module delays the first scrambled signals to obtain a plurality of delayed signals, performs XOR operations on the delayed signals and corresponding scrambled signals to obtain a plurality of transition signals, and counts the numbers of times signal value transition occurs in the transition signals to obtain the transmission powers.

9. A method for controlling access operations of a flash memory, comprising:
receiving first source data from a host;
generating a plurality of first scrambled signals according to a plurality of pseudo random sequences and the first source data;
obtaining a plurality of transmission powers of the first scrambled signals; and
selecting a target scrambled signal from the first scrambled signals according to the transmission powers for storing to the flash memory.

10. The method of claim 9, further comprising generating the plurality of first scrambled signals by scrambling the pseudo random sequences with the first source data.

11. The method of claim 9, further comprising dividing the first source data to generate a plurality of first input signals; and scrambling the first input signals with the pseudo random sequences to obtain the first scrambled signals.

12. The method of claim 9, further comprising delaying the first scrambled signals to obtain a plurality of delayed signals, performing XOR operations on the delayed signals and corresponding scrambled signals to obtain a plurality of transition signals, and counting the numbers of times signal value transition occurs in the transition signals to obtain the transmission powers.

* * * * *